March 11, 1952     C. L. DEWEY     2,588,913
TUBULAR METALLIC BAIT
Filed May 15, 1947
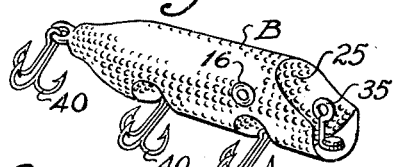
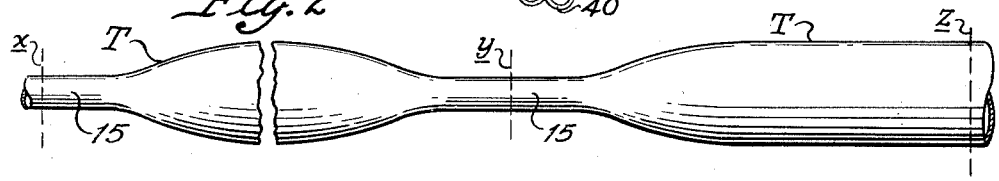
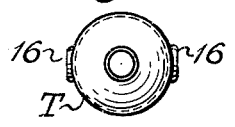  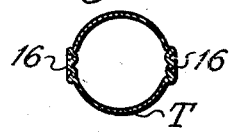
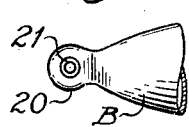 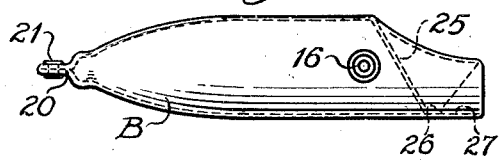 
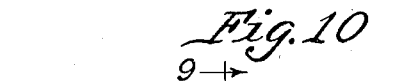
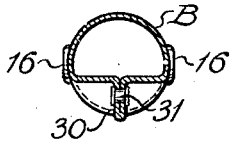 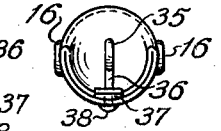
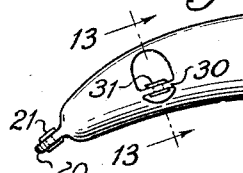 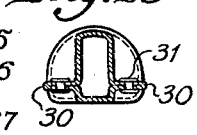 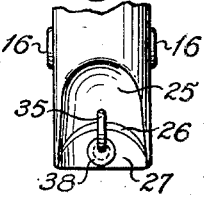
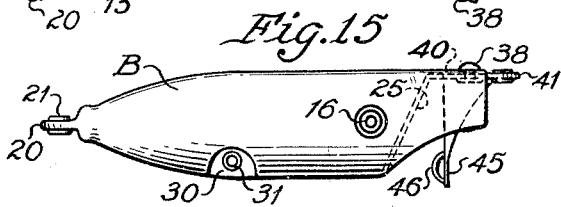
Inventor:
Clarence L. Dewey Patented Mar. 11, 1952

2,588,913

UNITED STATES PATENT OFFICE 2,588,913

TUBULAR METALLIC BAIT

Clarence L. Dewey, Grand Rapids, Mich.

Application May 15, 1947, Serial No. 748,201

1 Claim. (Cl. 43—42.35)

This invention relates to a fish lure made from tubular metal or other material which is capable of being shaped and worked as hereinafter described.

According to my invention, fish lures varying widely in contour and appearance may be produced from tubular metal, such as aluminum, by a procedure which is very simple and inexpensive. Such a bait may have imparted to it, as an incident of its production, a surface finish which will suggest the appearance of scales—a common objective in the art of fish lures. The resulting structure is also very strong and durable. It lends itself admirably to the reception of the usual fittings, and in use may be operated in much the same way as conventional baits of the plug type which are made from wood, plastic, or other suitable material.

A suggestive embodiment of this invention as well as the steps which may be employed advantageously in its construction, is illustrated in the accompanying drawing in the manner following:

Figure 1 is a view in perspective of a bait of conventional form as it appears when produced from tubular metal according to my invention;

Fig. 2 is a view in elevation of a long length of tubing necked in at recurrent intervals preliminary to severance into short lengths each adapted to be formed into a single bait body;

Fig. 3 is a view in elevation looking toward the small end of a short length of tubing after being severed along the dash lines indicated in Fig. 2;

Fig. 4 is a side elevation of the same short length of tubing after being embossed to provide simulated eyes on its opposite sides;

Fig. 5 is a transverse section, taken on line 5—5 of Fig. 4;

Fig. 6 is a fragmentary elevation in plan of the rear end portion of the short length of tubing after the neck thereof has been formed into a flattened tail;

Fig. 7 is a side elevation of the short length of tubing after its front end has been formed into a head thereby converting the tubing length substantially into the form and contour of a plug bait;

Fig. 8 is a front end elevation of the bait when in the stage shown in Fig. 7;

Fig. 9 is a transverse section through the completed bait, taken on line 9—9 of Fig. 10;

Fig. 10 is a side elevation of the completed bait;

Fig. 11 is a front elevation of the completed bait;

Fig. 12 is a fragmentary top elevation of the same bait;

Fig. 13 is a transverse section through a modified bait as per the construction of Fig. 14, the section being taken on line 13—13 thereof;

Fig. 14 is a side elevation of a completed bait having the modified construction as per Fig. 13; and Fig. 15 is a similar view of a bait incorporating a still further modified construction.

In producing the present bait a long length of tubing T is shaped inwardly at spaced intervals to provide a plurality of spaced necks 15. Desirably these necks are spaced apart a distance equal to the length of two of the bait bodies which are to be produced therefrom. The tubing is then severed medially of and between the necks, as along the lines $x$, $y$, and $z$, to provide a plurality of short lengths each having the form and contour that is shown in Fig. 4. At this stage each short length of tubing T may be subjected at opposite points to the action of embossing dies whereby to form in its opposite walls eyes 16. The normally cylindrical contour of the tubing may be preserved from start to finish except as hereinafter noted.

The next operation is a die-flattening of the neck 15 to produce a tail 20 having a hole 21 therethrough, the tail eventuating some what shorter than the neck. Also in the same operation, if desired, the tubing wall at the top front end is pressed inwardly to provide a downwardly slanting head 25 which is laterally concave. At its base the head is outturned at 26 to lie closely adjacent the bottom wall 27 whereby to close the space therebetween.

To the bait body B thus formed I add one or more saddles 30 along the bottom center. For this purpose oppositely acting dies may be employed to squeeze in the bait walls from opposite sides adjacent the bottom through a limited area whereby to provide one or more two-ply saddles (see Figs. 9 and 10) each formed therethrough with a hole wherein may be fitted in an eyelet 31. These saddles are desirably disposed flush with the bottom of the bait body. At the front of the bait, forwardly of the head 25, I may affix a line tie 35 comprising a shank 36 whose base 37 is secured by a rivet 38 passing therethrough and through the bottom wall 27 of the bait body B adjacent its front.

To complete the bait body the usual fittings may be added, such as gang hooks (see Fig. 1), one being attached to the tail 20 at the rear end and others to the saddles 30 which are formed in the bottom. A leader or line (not shown) may be attached to the line tie 35 whereby to manipulate the bait when it is to be cast, trolled, retrieved, or otherwise handled in the air or the water.

As an incident to the production of the present bait, the surface of the tubular body may be operated upon to produce the effect or the appearance of scales. This operation is performed desirably before the long length of tubing is severed, or while in the condition shown in Fig. 2. Such an operation involves a multiple peening of the entire surface of the tubing so that it becomes indented in a multitude of closely spaced places in a more or less regular pattern (see Fig. 1). As a result there is a removal of the metallic appearance and substitution instead of a finish which strongly suggests the presence of scales. Experience has proven that a bait so finished is highly attractive and fascinating as well.

The features of construction described up to this point may also be embodied in baits of modified contour. For example, Fig. 14 shows a bait whose body B is arched from end to end, with eyeletted saddles 30 extended laterally from its body on opposite sides thereof. The steps involved in its construction may follow those already described, plus a bending operation to produce the endwise arching of the bait. The parts in this bait are therefore designated by reference characters the same as are applied to like parts in the preceding figures.

A further example of bait having a construction somewhat modified from those heretofore described is suggested in Fig. 15. In this case, the front wall 25 at the head end of the bait is slanted upwardly and outwardly from the bottom to join with the top wall 40 in exactly the same manner as has already been described. In this case the line tie may comprise an eyeletted link 41 which is secured as by a rivet 38 to the bait top wall 40 at its front, this same rivet transversing also an angle bracket from which depends a braced leg 45 formed with an eye 46 to which a hook, single or multiple, may be attached in the usual way.

A bait body formed of tubular metal according to this invention possesses numerous advantages. It is practically indestructable, and will survive hard usage over many years. The bait may be designed to float or sink according to the thickness of the walls of the tube from which it is formed. While being made, a few drops of lacquer may be squirted in the short length of tubing before the head wall is formed therein, and the tubing may then be stood upright to permit the lacquer to run down into the tail end to seal any narrow opening that may remain after the neck 15 has been squeezed in to provide the flattened tail. Thereafter, when the front head wall 25 is pushed in and the hole has been formed for the line tie rivet, the bait body may be reversed to induce the lacquer to run down and seal the head. To apply a decorative or color finish, the bait may be hung by the tail on to a conveyor hook which then advances it into contact with a suitable lacquer which may apply its color to the front end portion of the bait as far rearwardly as desired. The lacquer is then hardened in the usual way. The embossed eyes 16 may be painted with quick drying lacquer as by pressing each eye down on to a firm cushion, such as Neoprene, that is covered with fresh lacquer of the desired color.

I claim:

A fishing lure simulating the appearance of live bait and comprising a substantially cylindrical body of which one end is tapered inwardly and rearwardly and provided beyond the tapered rear end portion with two contiguous flat terminal abutting portions constituting a two-ply tail closing the rear end of the body, the top wall of the body at the front end thereof being provided with a transversely curved inclined portion extending downwardly and forwardly to the inner face of the bottom wall and progressively depressed below the upper edges of the sides of the front portion of the body and closing the front end thereof, the bottom wall of the body and the lower end of said inclined portion being extended forwardly longitudinally of the body at an angle to the inclined end portion beyond the said inclined portion, providing a surface contact between the upper face of the bottom wall of the body portion and the extension of the inclined portion and also providing a front platform housed between the side walls of the body, said body having its side walls over relatively small areas compressed into abutting relation forming side indentations having inwardly extending top and side walls and open at the bottom and provided with registering openings and constituting a two-ply saddle.

CLARENCE L. DEWEY.

REFERENCES CITED

The following references are of record in the file of this patent:

UNITED STATES PATENTS

| Number | Name | Date |
| --- | --- | --- |
| 888,935 | Sams | May 26, 1908 |
| 1,326,821 | Ackerman | Dec. 30, 1919 |
| 1,415,653 | Koepke | May 9, 1922 |
| 1,608,375 | Dewey | Nov. 23, 1926 |
| 1,787,733 | Pagin | Jan. 6, 1931 |
| 1,878,015 | Steffensen | Sept. 20, 1932 |
| 1,948,005 | Pflueger | Feb. 20, 1934 |
| 1,951,626 | Pashley | Mar. 20, 1934 |
| 2,038,127 | Pflueger | Apr. 21, 1936 |
| 2,183,849 | Swanberg | Dec. 19, 1939 |
| 2,186,780 | DeWitt | Jan. 9, 1940 |
| 2,217,789 | Bobo | Oct. 15, 1940 |
| 2,251,721 | Shepherd | Aug. 5, 1941 |
| 2,275,253 | Eger | Mar. 3, 1942 |